UNITED STATES PATENT OFFICE.

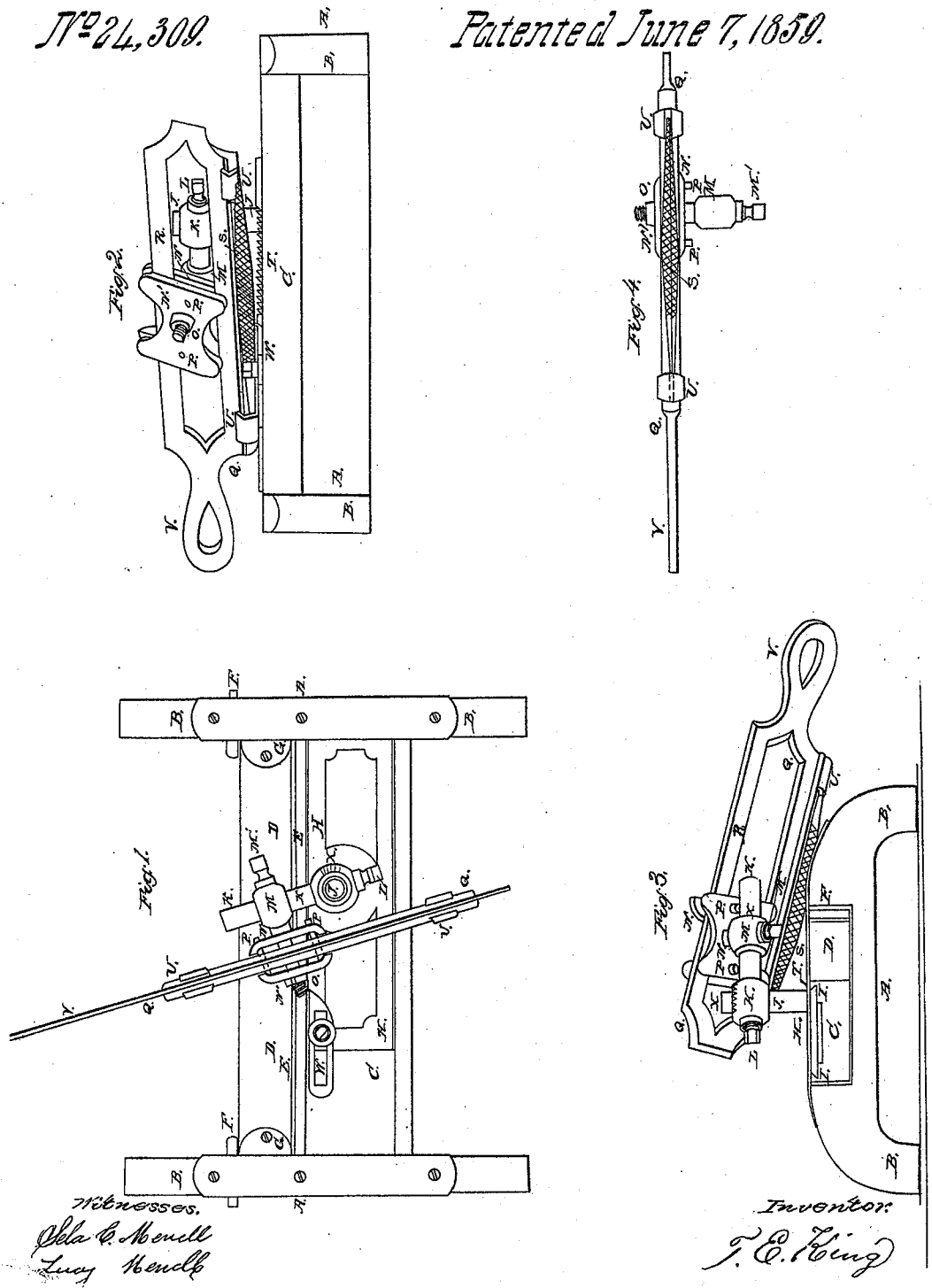

T. E. KING, OF WEST ANDOVER, OHIO.

SAW-FILING MACHINE.

Specification of Letters Patent No. 24,309, dated June 7, 1859.

*To all whom it may concern:*

Be it known that I, T. E. KING, of West Andover, in the county of Ashtabula and State of Ohio, have invented certain new and useful Improvements in Saw-Filing Machines; and I do hereby declare that the following is a full, clear, and exact description of the same, reference being had to the annexed drawings, making part of this specification, in which—

Figure 1, is a top view. Fig. 2, a side view. Fig. 3, is an end view, and Fig. 4, a detached section which will be referred to in the following description.

Like letters denote like parts in the several views.

The stand A, may be made of wood, or iron, and which consists of the legs B, table C, and jaw D. These parts may be arranged in any suitable manner for the purpose set forth. In each of the legs B, is a mortise which receives the ends of the jaw D, which jaw slides laterally in these mortises so as to allow the saw to be placed in the space E, Fig. 1, between the jaw D, and the table C. In this position the saw is held by means of the keys F, F, Figs. 1, and 3, or their equivalents, which force the jaw against the saw in the space E. Thus the saw is held as if in a vise between the jaw, and table. At each end of the jaw is placed a guard G, to prevent the jaw from sliding endwise.

The slide H, is connected to the table C, so as to slide upon it longitudinally, and to prevent the slide from rising up from the table, the slide ways are dovetailed as seen at I, I, Fig. 3, but which may be arranged in any other equivalent manner. To this slide is connected the standard J, from which extends the adjustable arm K. This arm turns, and slides up and down upon the standard, and to this arm is connected a set screw L, for holding the arm and its connections in any desired position. To this arm K, is attached the adjustable wrist M, which slides and turns upon the arm K. The wrist M, is provided also with a set screw M′ for securing the wrist in place upon the arm K. To this wrist is fixed the guide plate N, and to the outer end of the wrist is connected the guide plate N′. The extreme end of the wrist is provided with a nut, and screw, O, Figs. 1, 3, to aid in securing the plate N′, in place. To the plate N′, are attached two pins P, P, which extend to, and pass through the plate N, as seen in Fig. 1. These pins aid in connecting the plates together. They also form a rest, and guide, for the pile stock Q, which slides between the guide plates.

The upper bar R, of the stock slides upon the pins P, P, which keeps the pile S, a uniform distance from the saw T. In the center of the stock is an open space for the pins P, P, so as to allow the stock to be operated, and also lightens it. The upper boundary of the slot formed by the bar R, is curved, so as to present a surface very nearly corresponding to the curve of the file, by which means the file is constantly carried to the same depth upon the edge of the saw. To the lower side of the stock is secured the file S, by two clamps U, U, at each end, Figs. 2, 4.

The saw being secured in place as before described, the stock is then operated by the handle V, so as to give the file the proper motion for filing the teeth, and when one tooth is filed, the slide with the standard, and its connections are moved along one or more teeth as may be required, and then held in this position for filing the next tooth, by means of the catch W, which enters each tooth space consecutively as each tooth is being filed, so that each of the teeth will be filed a uniform distance apart. The gage or catch W, will retain the slide and its connections in the desired position while each tooth is being filed, and by means of the arm K, and wrist M, the file and stock can be raised, and lowered, and adjusted at any angle, and at the same time the stock, and file, may be so placed by turning the wrist upon the arm K, and by arranging the arm K, upon the standard J, that the teeth may be filed at angles, and by the same means any desirable rake given to the teeth which is a very desirable object in filing various kinds of saws.

The wrist M, may be adjusted upon the arm K, independent of the arm and standard J, and the arm K, may be moved in any direction upon the standard J, independently of the other parts. Thus the wrist, and arm may be set independently of each other, or together as the nature of the case may require.

Upon the wrist and arm is placed an index or gage X, X, by which the stock and file, may at all times be set from one angle to another, and a uniformity at all times retained in making these changes, so that each saw will always be filed at the same angle by setting the arm and wrist by the gage.

What I claim as my improvement and for which I desire to secure Letters Patent, is—

The suspending the file holder upon arms as herein set forth, so that it is susceptible of adjustment, horizontally, vertically and obliquely, and in combination with the curve faced slot in the holder, as described.

T. E. KING.

Witnesses:
SELA C. MERRELL,
LUCY MERRELL.